US012343695B2

(12) United States Patent
Pavlik

(10) Patent No.: US 12,343,695 B2
(45) Date of Patent: *Jul. 1, 2025

(54) TRANSPORTABLE MIXING SYSTEM FOR BIOLOGICAL AND PHARMACEUTICAL MATERIALS

(71) Applicant: Advanced Scientifics, Inc., Millersburg, PA (US)

(72) Inventor: Rudolf Pavlik, Millersburg, PA (US)

(73) Assignee: Advanced Scientifics, Inc., Millersburg, PA (US)

( * ) Notice: Subject to any disclaimer, the term of this patent is extended or adjusted under 35 U.S.C. 154(b) by 826 days.

This patent is subject to a terminal disclaimer.

(21) Appl. No.: 17/521,201

(22) Filed: Nov. 8, 2021

(65) Prior Publication Data

US 2022/0054996 A1 Feb. 24, 2022

Related U.S. Application Data

(63) Continuation of application No. 16/515,322, filed on Jul. 18, 2019, now Pat. No. 11,179,687, which is a (Continued)

(51) Int. Cl.

*B01F 33/00* (2022.01)
*B01F 27/808* (2022.01)

(Continued)

(52) U.S. Cl.

CPC ........ *B01F 33/5014* (2022.01); *B01F 27/808* (2022.01); *B01F 27/88* (2022.01);

(Continued)

(58) Field of Classification Search

CPC .... B01F 35/513; B01F 35/42; B01F 33/5014; B01F 21/10

See application file for complete search history.

(56) References Cited

U.S. PATENT DOCUMENTS

| | | | |
|---|---|---|---|
| 515,056 | A | 2/1894 | Reiley |
| 2,162,400 | A | 6/1939 | Heath |

(Continued)

FOREIGN PATENT DOCUMENTS

| | | |
|---|---|---|
| DE | 102 01 811 | 7/2003 |
| DE | 10 2009 041569 A1 | 4/2011 |

(Continued)

OTHER PUBLICATIONS

Bioreactor System, publicly disclosed by HyClone Laboratories, Inc., at least as early as Jan. 15, 2010, 6 pages.

(Continued)

*Primary Examiner* — Anshu Bhatia

(57) ABSTRACT

A mixing system includes a container having an encircling sidewall bounding a chamber and extending between an upper end and an opposing lower end; a support plate disposed within the chamber and secured to the encircling sidewall; an inner wall secured to the support plate and projecting within the chamber toward the upper end, an open space being formed between the inner wall and the encircling sidewall; and a first aperture extending through the encircling sidewall so as to communicate with the open space. A mixing assembly is positioned within the container and is supported on the support plate, the mixing assembly including a pliable enclosure and a mixing device.

13 Claims, 11 Drawing Sheets

Related U.S. Application Data continuation of application No. 15/602,804, filed on May 23, 2017, now Pat. No. 10,399,049, which is a continuation of application No. 14/657,550, filed on Mar. 13, 2015, now Pat. No. 9,687,799, which is a continuation of application No. 14/338,607, filed on Jul. 23, 2014, now Pat. No. 8,979,357.

(60) Provisional application No. 61/953,998, filed on Mar. 17, 2014.

(51) Int. Cl.

| | |
|---|---|
| ***B01F 27/88*** | (2022.01) |
| ***B01F 33/501*** | (2022.01) |
| ***B01F 35/32*** | (2022.01) |
| ***B01F 35/42*** | (2022.01) |
| ***B01F 35/511*** | (2022.01) |
| ***B01F 35/513*** | (2022.01) |
| ***B65D 77/06*** | (2006.01) |
| *B01F 21/10* | (2022.01) |
| *B01F 101/22* | (2022.01) |
| *B01F 101/44* | (2022.01) |

(52) U.S. Cl.

CPC .......... *B01F 33/00* (2022.01); *B01F 33/5013* (2022.01); *B01F 35/32* (2022.01); *B01F 35/42* (2022.01); *B01F 35/511* (2022.01); *B01F 35/513* (2022.01); *B65D 77/06* (2013.01); *B01F 21/10* (2022.01); *B01F 35/3211* (2022.01); *B01F 35/3213* (2022.01); *B01F 2101/22* (2022.01); *B01F 2101/44* (2022.01)

(56) References Cited

U.S. PATENT DOCUMENTS

| | | | | |
|---|---|---|---|---|
| 2,797,903 | A | 7/1957 | Urban | |
| 3,112,047 | A | 11/1963 | Weinreich et al. | |
| 3,190,442 | A | 6/1965 | Gauss | |
| 3,343,344 | A | 9/1967 | Fairaizl et al. | |
| 3,343,719 | A | 9/1967 | Kastamo | |
| 3,503,177 | A | 3/1970 | Kropscott et al. | |
| 3,647,397 | A | 3/1972 | Coleman | |
| 3,946,780 | A | 3/1976 | Sellers | |
| 4,171,751 | A | 10/1979 | Schutz | |
| 4,649,118 | A | 3/1987 | Anderson | |
| 4,711,582 | A | 12/1987 | Kennedy | |
| 4,805,799 | A | 2/1989 | Robbins, III | |
| 4,828,395 | A | 5/1989 | Saito et al. | |
| 4,844,286 | A | 7/1989 | Jacobson | |
| 4,907,723 | A | 3/1990 | Katz | |
| 4,968,624 | A | 11/1990 | Bacehowski et al. | |
| 5,067,636 | A | 11/1991 | Pfeiffer et al. | |
| 5,356,214 | A | 10/1994 | Styles | |
| 5,362,642 | A | 11/1994 | Kem | |
| 5,422,043 | A | 6/1995 | Burris | |
| 5,458,771 | A | 10/1995 | Todd | |
| 5,584,577 | A | 12/1996 | Thies | |
| 5,665,070 | A | 9/1997 | Mcphee | |
| 5,727,878 | A | 3/1998 | Sullivan, Jr. | |
| 5,799,380 | A | 9/1998 | Pfeifer | |
| 5,799,830 | A | 9/1998 | Carroll et al. | |
| 5,858,283 | A | 1/1999 | Burris | |
| 5,941,635 | A | 8/1999 | Stewart | |
| 5,988,422 | A | 11/1999 | Vallot | |
| 6,071,005 | A | 6/2000 | Ekambaram et al. | |
| 6,076,457 | A | 6/2000 | Vallot | |
| 6,083,587 | A | 7/2000 | Smith et al. | |
| 6,186,932 | B1 | 2/2001 | Vallot | |
| 6,245,555 | B1 | 6/2001 | Curtis | |
| 6,280,077 | B1 | 8/2001 | Sullivan, Jr. | |
| 6,416,215 | B1 | 7/2002 | Terentiev | |
| 6,491,422 | B1 | 12/2002 | Rutten et al. | |
| 6,494,613 | B2 | 12/2002 | Terentiev | |
| 6,554,164 | B1 | 4/2003 | Jones | |
| 6,617,146 | B1 | 9/2003 | Naccarato et al. | |
| 6,634,783 | B2 | 10/2003 | Baron | |
| 6,655,655 | B1 | 12/2003 | Matkovich et al. | |
| 6,670,171 | B2 | 12/2003 | Carll | |
| 6,709,862 | B2 | 3/2004 | Curtis | |
| 6,773,678 | B2 | 8/2004 | Cummings et al. | |
| 6,837,610 | B2 | 1/2005 | Cadogan et al. | |
| 6,889,454 | B2 | 5/2005 | Chandaria | |
| 6,908,223 | B2 | 6/2005 | Bibbo et al. | |
| 6,923,567 | B2 | 8/2005 | Bibbo et al. | |
| 6,965,288 | B2 | 11/2005 | Terentiev | |
| 6,981,794 | B2 * | 1/2006 | Bibbo | B01F 33/71 366/314 |
| 7,070,318 | B2 | 7/2006 | Renfro | |
| 7,086,778 | B2 | 8/2006 | Terentiev | |
| 7,153,021 | B2 | 12/2006 | Goodwin et al. | |
| 7,156,648 | B2 | 1/2007 | Olaru | |
| 7,249,880 | B2 | 7/2007 | Zambaus | |
| 7,267,479 | B2 | 9/2007 | Terentiev | |
| 7,278,780 | B2 | 10/2007 | Goodwin et al. | |
| 7,300,583 | B1 | 11/2007 | Heppenstall et al. | |
| 7,357,567 | B2 | 4/2008 | Terentiev | |
| 7,384,027 | B2 | 6/2008 | Terentiev et al. | |
| 7,384,783 | B2 | 6/2008 | Kunas et al. | |
| 7,431,494 | B2 | 10/2008 | Zambaux | |
| 7,434,983 | B2 | 10/2008 | Terentiev | |
| 7,469,884 | B2 | 12/2008 | Terentiev et al. | |
| 7,481,572 | B2 | 1/2009 | Terentiev | |
| 7,487,688 | B2 | 2/2009 | Goodwin | |
| 7,516,648 | B2 | 4/2009 | Terentiev | |
| 7,682,067 | B2 | 3/2010 | West et al. | |
| 7,695,186 | B2 | 4/2010 | Terentiev | |
| 7,762,716 | B2 | 7/2010 | Terentiev et al. | |
| 7,784,997 | B2 | 8/2010 | Neumann | |
| 7,879,599 | B2 | 2/2011 | Goodwin et al. | |
| 7,901,934 | B2 | 3/2011 | Kunas et al. | |
| 7,921,624 | B2 | 4/2011 | Ours et al. | |
| 7,992,846 | B2 | 8/2011 | Terentiev et al. | |
| 8,123,188 | B2 | 2/2012 | Banfield | |
| RE43,418 | E | 5/2012 | Zambaux | |
| 8,182,137 | B2 | 5/2012 | Terentiev | |
| 8,282,267 | B2 | 10/2012 | Castillo et al. | |
| 8,292,491 | B2 | 10/2012 | Castillo et al. | |
| 8,366,311 | B2 | 2/2013 | Vanhamel et al. | |
| 8,469,584 | B2 | 6/2013 | White et al. | |
| 8,608,369 | B2 | 12/2013 | Lee et al. | |
| 8,623,640 | B2 | 1/2014 | Kunas et al. | |
| 8,746,964 | B2 | 6/2014 | Castillo et al. | |
| 8,753,005 | B2 | 6/2014 | Singh et al. | |
| 8,979,357 | B1 | 3/2015 | Pavlik | |
| 9,314,751 | B2 | 4/2016 | Goodwin et al. | |
| 9,540,606 | B2 | 1/2017 | Kunas et al. | |
| 9,687,799 | B2 * | 6/2017 | Pavlik | B01F 35/511 |
| 9,840,689 | B2 | 12/2017 | Chaussin | |
| 10,035,116 | B2 | 7/2018 | Jones et al. | |
| 10,399,049 | B2 | 9/2019 | Pavlik | |
| 2002/0105856 | A1 | 8/2002 | Terentiev | |
| 2002/0131654 | A1 | 9/2002 | Smith et al. | |
| 2002/0145940 | A1 | 10/2002 | Terentiev | |
| 2003/0077466 | A1 | 4/2003 | Smith et al. | |
| 2003/0231546 | A1 | 12/2003 | Bibbo et al. | |
| 2004/0062140 | A1 | 4/2004 | Cadogan et al. | |
| 2004/0136265 | A1 | 7/2004 | Meier et al. | |
| 2004/0190372 | A1 | 9/2004 | Goodwin et al. | |
| 2005/0002274 | A1 | 1/2005 | Terentiev | |
| 2005/0239199 | A1 | 10/2005 | Kunas et al. | |
| 2005/0276158 | A1 | 12/2005 | Thomas | |
| 2006/0240546 | A1 | 10/2006 | Goodwin et al. | |
| 2006/0270036 | A1 | 11/2006 | Goodwin et al. | |
| 2006/0280028 | A1 | 12/2006 | West et al. | |
| 2007/0242562 | A1 | 10/2007 | Huang | |
| 2007/0253287 | A1 | 11/2007 | Myhrberg | |
| 2008/0008028 | A1 | 1/2008 | Terentiev et al. | |
| 2008/0206847 | A1 | 8/2008 | Kunas et al. | |
| 2009/0188211 | A1 | 7/2009 | Galliher et al. | |
| 2010/0028990 | A1 | 2/2010 | Broadley et al. | |
| 2010/0149908 | A1 | 6/2010 | Singh et al. | |

(56) References Cited

U.S. PATENT DOCUMENTS

| | | | |
|---|---|---|---|
| 2010/0197003 | A1 | 8/2010 | Terentiev et al. |
| 2011/0013474 | A1 | 1/2011 | Ludwig et al. |
| 2011/0117594 | A1 | 5/2011 | Kunas et al. |
| 2011/0188928 | A1 | 8/2011 | West et al. |
| 2011/0310696 | A1 | 12/2011 | Goodwin et al. |
| 2012/0175012 | A1 | 7/2012 | Goodwin et al. |
| 2012/0177533 | A1 | 7/2012 | Lee et al. |

FOREIGN PATENT DOCUMENTS

| | | | |
|---|---|---|---|
| EP | 0 239 962 | | 10/1987 |
| EP | 0343885 | A1 | 11/1989 |
| EP | 1 321 756 | A1 | 6/2003 |
| EP | 1 462 155 | A1 | 9/2004 |
| EP | 1 762 607 | A1 | 3/2007 |
| GB | 2202549 | A | 9/1988 |
| JP | 60-151400 | | 10/1985 |
| JP | 1-180228 | | 7/1989 |
| JP | 2-035925 | | 2/1990 |
| JP | 2-057174 | | 2/1990 |
| JP | 5-284966 | | 11/1993 |
| JP | 6-285353 | | 10/1994 |
| JP | 8-108057 | | 4/1996 |
| JP | 10-073164 | | 3/1998 |
| JP | 11-028346 | | 2/1999 |
| JP | 2001-224938 | | 8/2001 |
| JP | 2005-080662 | | 3/2005 |
| WO | 2005/068059 | | 7/2005 |
| WO | 2008/151105 | A1 | 12/2008 |

OTHER PUBLICATIONS

Thermo Scientific HyClone BPC Products and Capabilities 2008/2009 Catalog, Accessories, p. 41.

Fisher Scientific, Fisher Catalog 2006/2007, Tissue Culture/Flexible Reagent Bags, p. 1898-1900.

International Search Report and Written Opinion dated Jun. 26, 2015, issued in PCT Application No. PCT/UC2015/020670, filed Mar. 16, 2015.

U.S. Appl. No. 14/338,607, filed Jul. 23, 2014.

U.S. Appl. No. 14/657,550, filed Mar. 13, 2015.

U.S. Appl. No. 15/506,804, filed May 23, 2017.

U.S. Appl. No. 16/515,322, filed Jul. 17, 2019.

* cited by examiner

TRANSPORTABLE MIXING SYSTEM FOR BIOLOGICAL AND PHARMACEUTICAL MATERIALS

CROSS-REFERENCE TO RELATED APPLICATIONS

This application is a continuation of U.S. application Ser. No. 16/515,322, filed Jul. 18, 2019, now U.S. Pat. No. 11,179,687, which is a continuation of U.S. application Ser. No. 15/602,804, filed May 23, 2017, now U.S. Pat. No. 10,399,049, which is a continuation of U.S. application Ser. No. 14/657,550, filed Mar. 13, 2015, now U.S. Pat. No. 9,687,799, which is a continuation of Ser. No. 14/338,607, filed on Jul. 23, 2014, now U.S. Pat. No. 8,979,357, that claims the benefit of and priority to U.S. Provisional Patent Application No. 61/953,998 filed on Mar. 17, 2014, all of which are hereby incorporated by reference in their entirety.

FIELD OF THE INVENTION

The present invention is directed to a mixing system and a mixing arrangement. More specifically, the present invention is directed to a mixing system and mixing arrangement for both mixing and transporting biological and pharmaceutical materials.

BACKGROUND OF THE INVENTION

Various solutions, such as culture media, buffers, reagents, and other biological materials are used extensively in research and development. Often, the solutions are used in creating vaccines, producing and purifying proteins, and developing other biologics. Many solutions include precise compositions, are frequently required to be pure and sterile, and may be highly regulated. As such, manufacturing of these solutions is expensive and often requires specialized equipment.

Due to the cost of creating, operating, and maintaining the systems used in the manufacture of many solutions, companies frequently purchase the solutions from a manufacturer in their final form. Typically, manufacturers produce master batches of the solution in large quantities, then transfer the solution from the master batches into smaller individual containers for shipping. Dynamic forces experienced during shipping may compromise the integrity of currently available mixing containers, such as mixing bags. As such, the solution is usually shipped in individual transportation containers.

During shipping, or storage of the solution after shipping, the solution may settle in the transportation containers. The settled solution requires mixing prior to use, and may settle in a manner that cannot be mixed, thus resulting in a loss of material. The transportation containers are usually non-mixing, such that, prior to use, the solution must be transferred from the transportation container into a mixing container at an end-user facility. Transferring the solution from the transportation container to the mixing container increases a risk of contamination, as well as preparation time prior to use and loss of material. Additionally, the use of multiple containers for a single solution increases an overall cost of the solution.

A mixing system, mixing container, and mixing method that show one or more improvements in comparison to the prior art would be desirable in the art.

BRIEF DESCRIPTION OF THE INVENTION

In an embodiment, a mixing system includes a rigid container including an integral support plate; a mixing assembly positioned within the rigid container and supported on the integral support plate, the mixing assembly including a pliable enclosure containing a fluid and a mixing device, a portion of the mixing device extending from the pliable enclosure and adapted to be detachably coupled to a drive mechanism; and a first plate detachably secured to the rigid container, the rigid container, the integral support plate, and the first plate defining a chamber surrounding the pliable enclosure. The pliable enclosure is in compression between the first plate and the integral support plate.

In another embodiment, a mixing arrangement includes a docking station including a drive cradle and a drive mechanism; a rigid container including an integral support plate, the rigid container removably positioned within the drive cradle; a mixing assembly positioned within the rigid container and supported on the integral support plate, the mixing assembly including a pliable enclosure containing a fluid and a mixing device, a portion of the mixing device extending from the pliable enclosure and adapted to be detachably coupled to the drive mechanism; an aperture formed through a side wall of the rigid container, the aperture providing access to the mixing assembly disposed within the rigid container; and a first plate configured to be detachably secured to the rigid container. The pliable enclosure is in compression between the first plate and the integral support when the first plate is secured to the rigid container.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are a system and arrangement for transporting and mixing a solution. Although described primarily with respect to a mixing assembly, and more particularly to a mixing assembly available from Advanced Scientifics Incorporated in Millersburg, PA, the invention is not so limited and other solution containing members may also be used in transporting and mixing the solution. Such other solution containing members include, without limitation, any other pliable enclosure, mixing bag, or mixing compartment suitable for being positioned with a rigid container disclosed herein.

Embodiments of the present disclosure, in comparison to systems not using one or more of the features disclosed herein, provide a rigid container for compressing a mixing assembly, provide support for transporting a solution in a mixing assembly, increase a strength of a mixing assembly, reduce or eliminate an effect of dynamic forces on a mixing assembly during transportation, provide mixing and transportation of a solution in a mixing assembly, reduce transferring of a solution between containers, reduce contamination of a solution, maintain a sterility of a solution, maintain a sterility of a solution containing a biological and/or pharmaceutical material, provide a scalable container for transporting a solution in mixing assemblies of various sizes, provide a transportation container having access to a solution, or a combination thereof.

Figure 1:
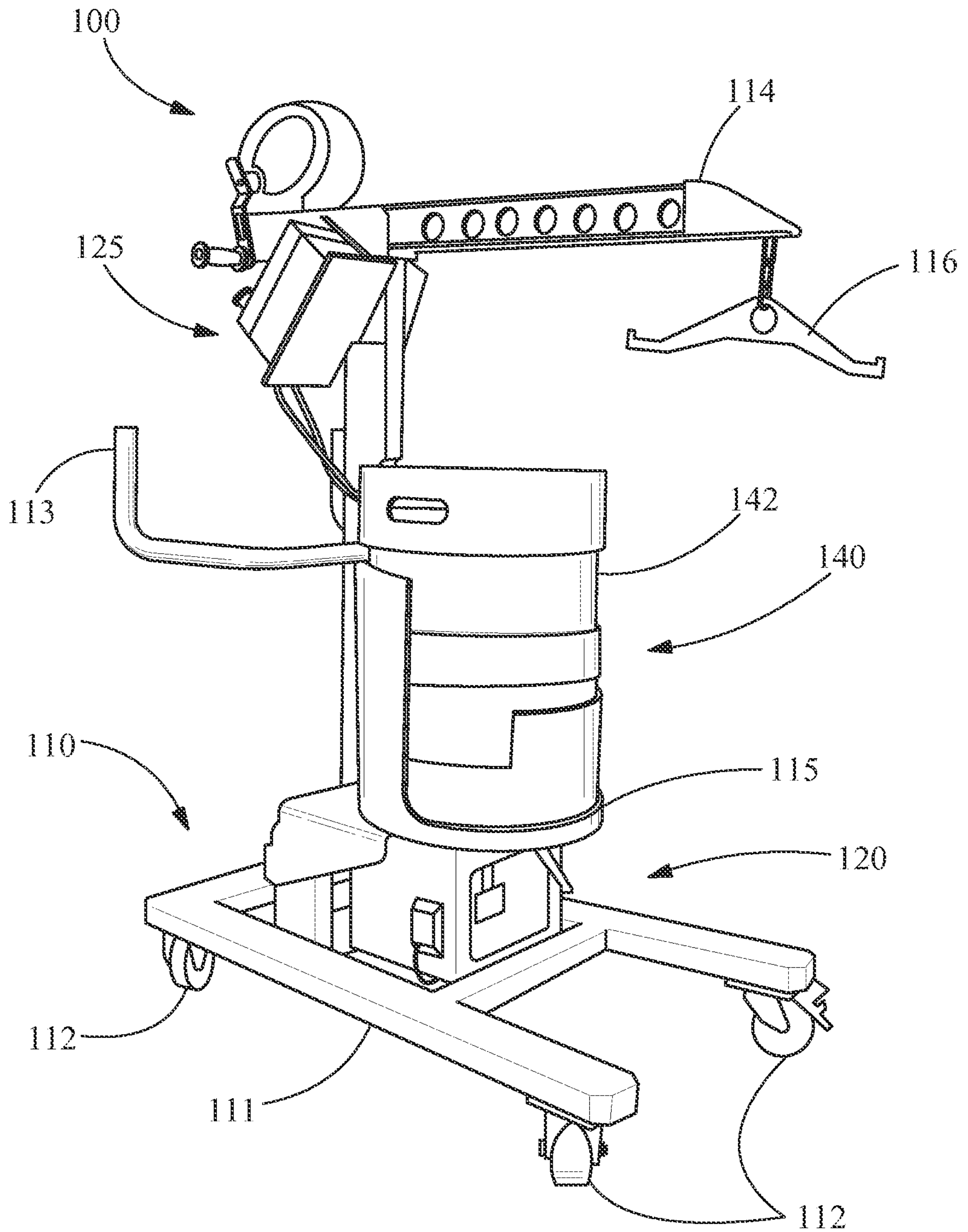
FIG. 1 is a perspective view of a mixing system according to an embodiment of the disclosure.

Referring to FIG. 1, a mixing system 100 is provided for transporting and mixing solutions, such as, but not limited to, powder and liquid solutions, liquid and liquid solutions, biological materials, pharmaceutical materials, or a combination thereof. In one embodiment, the mixing system 100 includes a docking station 110, a drive mechanism 120, a control element 125 electronically coupled to the drive mechanism 120, a mixing assembly 130 (FIG. 2), and a rigid container 140. The docking station 110, the drive mechanism 120, and the control element 125 provide mixing of a solution within the mixing assembly 130, prior to shipping and/or upon receipt of the solution. The rigid container 140 serves as a shipping container for the mixing assembly 130 during transport as well as to support the mixing assembly and fluid contained therein during mixing operations. As a result, the mixing assembly 130 can be used to agitate fluid contained therein to obtain a thorough mixture of any material that may have settled out over time or during transport, without requiring any transfer of fluid to a new container.

Figure 2:
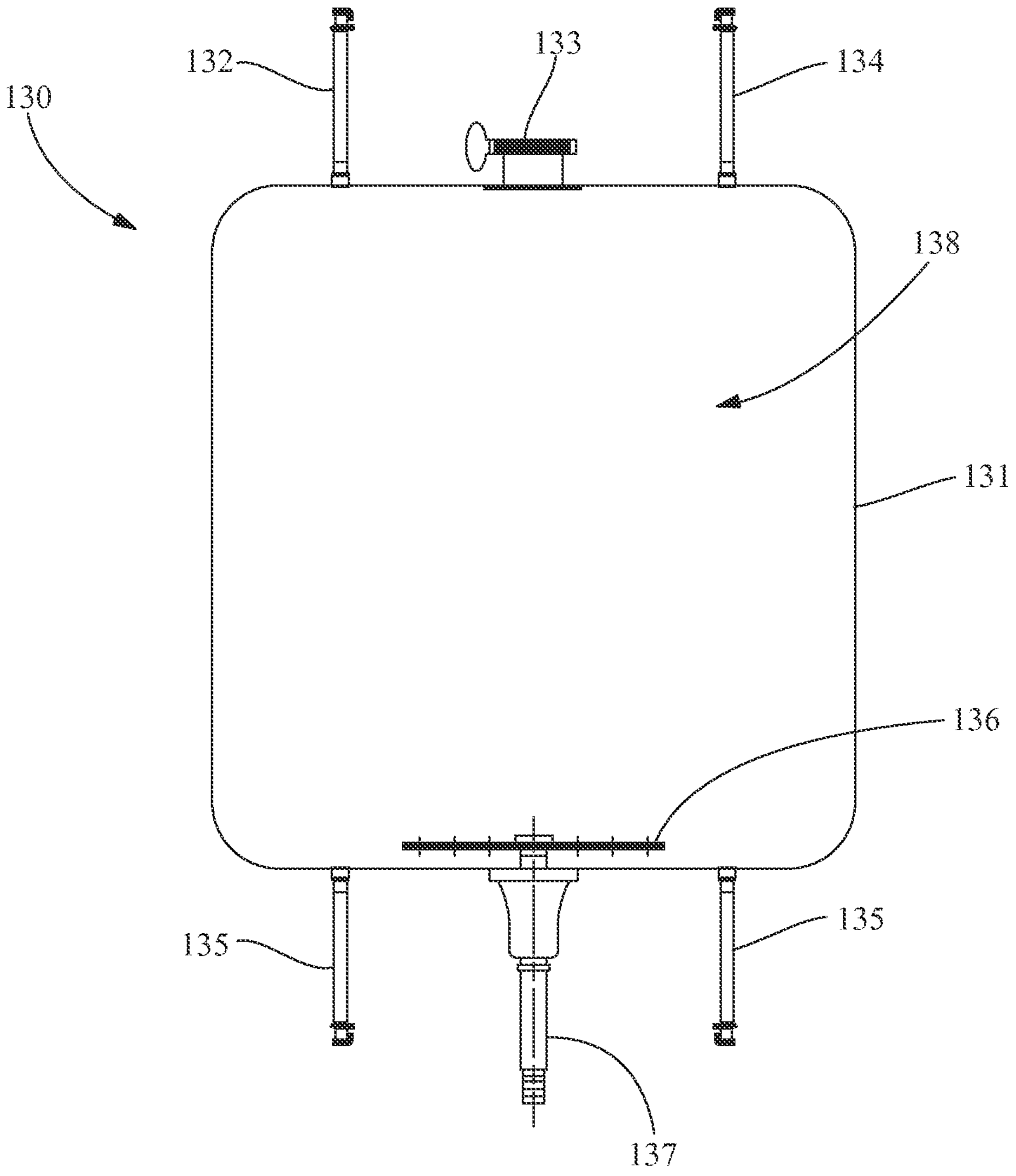
FIG. 2 is a perspective view of a mixing assembly.

The mixing assembly 130 includes any suitable assembly for receiving, storing, and/or mixing solutions. For example, as seen in FIG. 2, one suitable mixing assembly 130 includes an imPULSE Mixing Bag available from Advanced Scientifics Incorporated in Millersburg, PA. In one embodiment, the mixing assembly 130 includes a pliable enclosure 131, such as a mixing bag, a liquid inlet 132, a powder inlet 133, a vent 134, at least one outlet 135, and a mixing device 136 enclosed within the pliable enclosure 131. The liquid inlet 132, the powder inlet 133, the vent 134, and the at least one outlet 135 are in fluid communication with a compartment 138 of the pliable enclosure 131. A mixing shaft 137 is coupled to the mixing device 136, and extends through the pliable enclosure 131. In one embodiment, the mixing shaft 137 is detachably secured to the mixing device 136, such that that mixing shaft 137 is removable from the mixing assembly 130. In an alternate embodiment, the mixing shaft 137 is integral with the mixing device 136, preventing removal of the mixing shaft 137 from the mixing device 136 and/or the mixing assembly 130. The pliable enclosure 131 and/or the mixing shaft 137 are disposable, reusable, or a combination thereof. For example, in one embodiment, the mixing shaft 137 is detachable from the mixing device 136 and reusable, while the pliable enclosure 131 is a disposable, single use, mixing bag. In another example, the mixing shaft 137 is integral with the mixing device 136, such that the pliable enclosure 131 and the mixing shaft 137 are both either reusable or disposable.

The pliable enclosure 131 bounds the compartment 138 for receiving and/or storing a solution. For example, in one embodiment, the compartment 138 is sized to hold fluid amounts including, but not limited to, up to about 1 liter, 5 liters, 10 liters, 20 liters, 250 liters, 500 liters, 750 liters, 1,000 liters, 1,500 liters, 3,000 liters, 5,000 liters, 10,000 liters, or any other suitable amount. In another embodiment, the pliable enclosure 131 includes any suitable combination of plies, materials, thicknesses, panels, and/or seams for containing the solution therein, as described in U.S. Pat. No. 6,923,567, which issued on Aug. 2, 2005, and is hereby incorporated by specific reference in its entirety. In another example, one pliable enclosure 131 includes a flexible, water impermeable, single ply material having a thickness of between about 0.1 mm to about 5 mm, and being formed from three or more of the panels. The materials include, but are not limited to, polyethylene (PE), ethyl vinyl acetate (EVA), any pliable material suitable for bounding the compartment 138 and containing the solution, or a combination thereof.

The mixing shaft 137 detachably couples the mixing device 136 to the drive mechanism 120 to provide movement (e.g., articulation, reciprocal axial movement) of the mixing device 136 within the compartment 138. In one embodiment, the mixing device 136 includes multiple slots and film flaps disposed thereon. The film flaps are formed from any suitable material for creating fluid movement, such as, but not limited to, silicone, or any other flexible, impermeable, and/or semi-impermeable material. The movement of the mixing device 136 including the multiple slots and film flaps, along with a shape of the pliable enclosure 131, creates turbulence in the solution within the pliable enclosure 131 to pull content into a fluid stream without creating a vortex. The turbulence and the fluid stream formed in the solution within the pliable enclosure 131 completely, or substantially completely mix the solution in the compartment 138 to provide consistent and efficient mixing throughout the mixing assembly 130.

Figure 3:
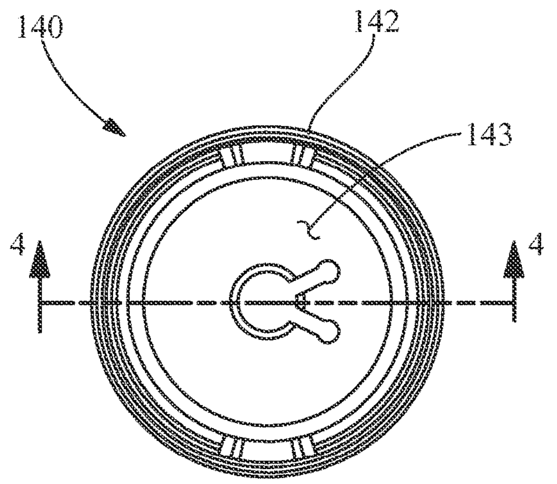
FIG. 3 is a top view of a rigid container according to an embodiment of the disclosure.
Figure 4:
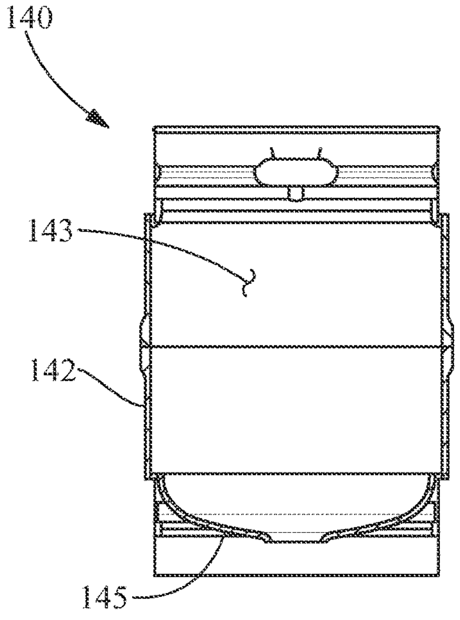
FIG. 4 is a cross-section view of the rigid container of FIG. 3.
Figure 5:
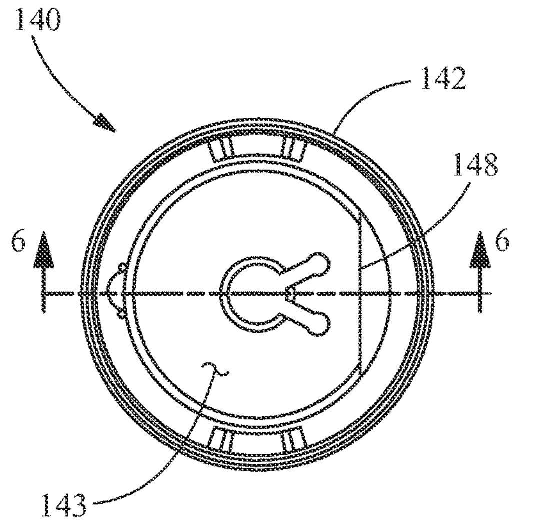
FIG. 5 is a top view of a rigid container according to an embodiment of the disclosure.
Figure 6:
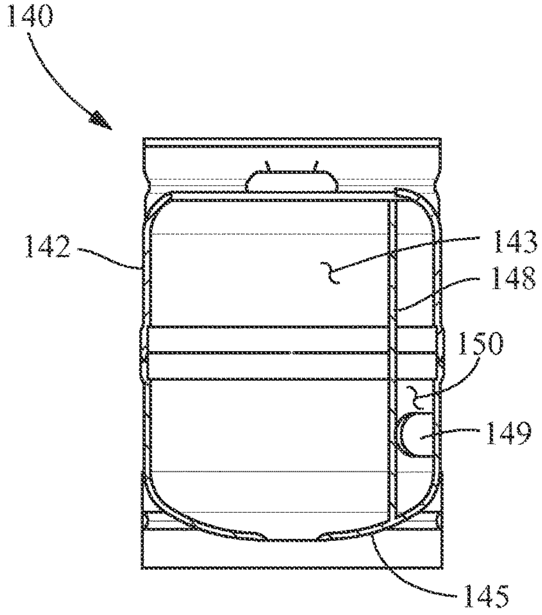
FIG. 6 is a cross-section view of the rigid container of FIG. 5.
Figure 7:
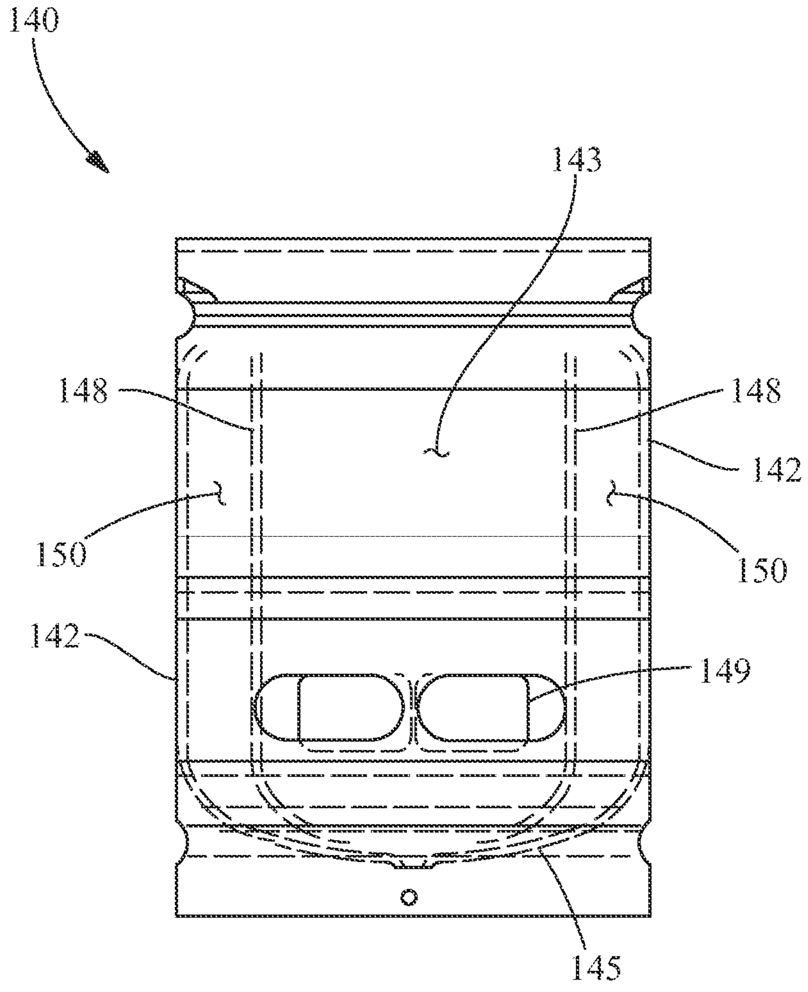
FIG. 7 is a cross-section view of a rigid container having a coaxial inner wall.

Referring to FIGS. 3-4, the rigid container 140 includes a side wall 142 and an integral support plate 145 that define an inner portion 143. In one embodiment, as illustrated in FIGS. 5-6, the container 140 includes an inner wall 148, the inner wall 148 and the integral support plate 145 defining the inner portion 143. Additionally, the inner wall 148 forms an open space 150 between the side wall 142 and the inner wall 148. In another embodiment, the side wall 142 and/or the inner wall 148 include an aperture 149 formed therein, the aperture 149 providing access to the open space 150 and/or the inner portion 143. Referring to FIG. 7, in an alternate embodiment, the inner wall 148 is positioned coaxially within the side wall 142, the inner wall 148 and the integral support plate 145 defining the inner portion 143.

Figure 8:
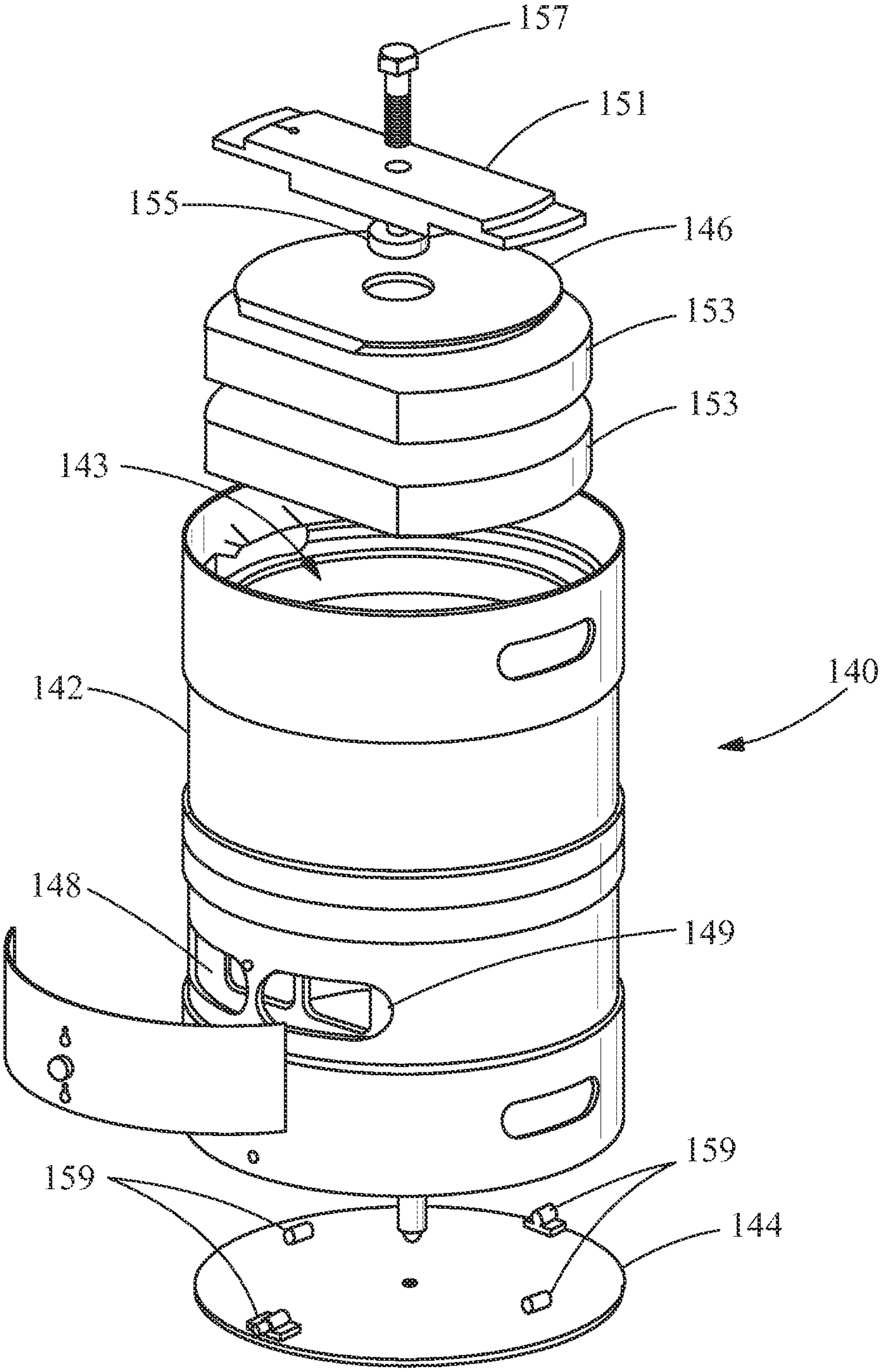
FIG. 8 is an exploded view of a rigid container according to an embodiment of the disclosure.
Figure 9:
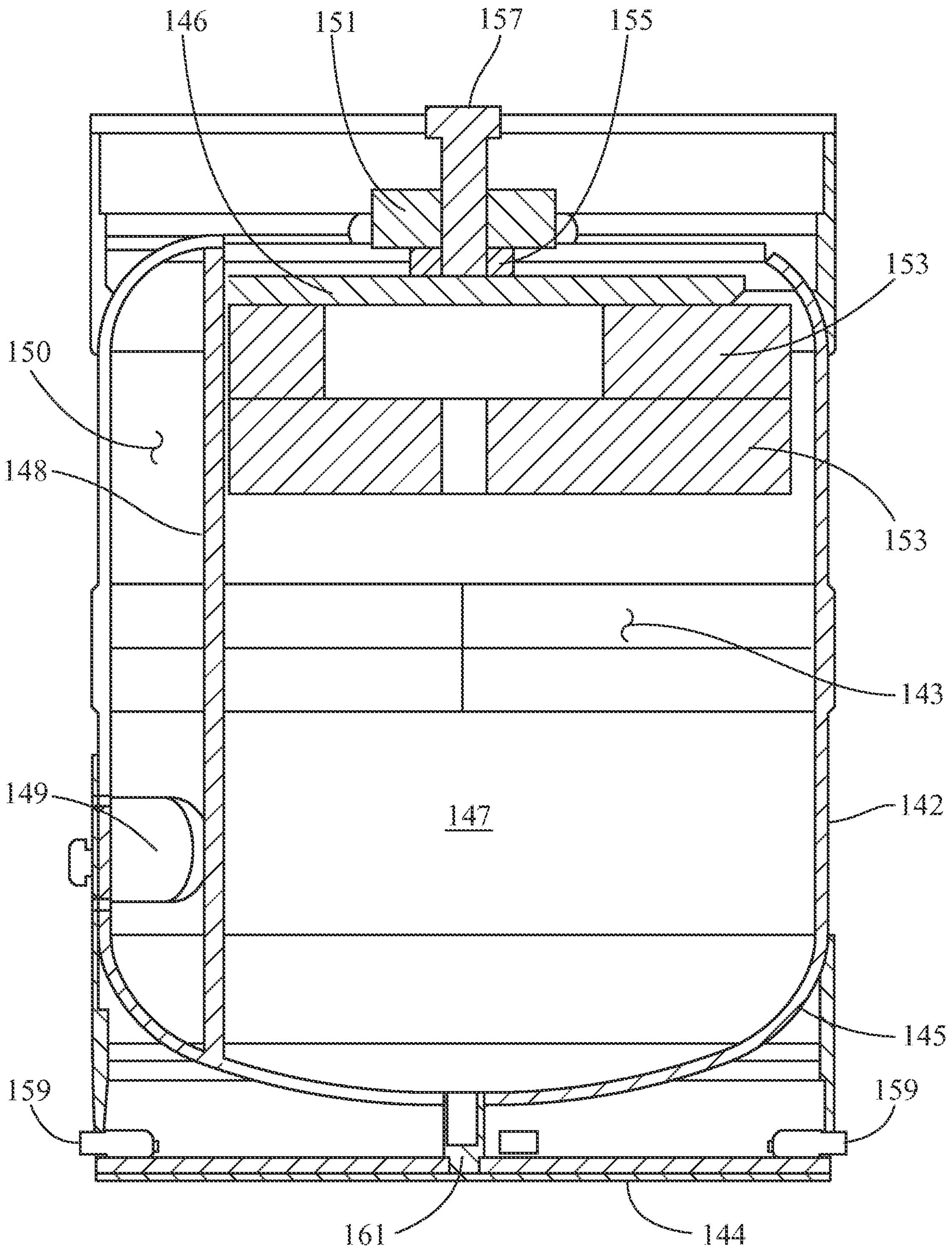
FIG. 9 is a cross-section view of the rigid container of FIG. 8.

As illustrated in FIGS. 8-9, a first plate 146 and a second plate 144 are detachably secured to the rigid container 140.

In one embodiment, the first plate 146 and/or the second plate 144 is secured to the rigid container 140 using any suitable securing member, such as, but not limited to, a compression assembly, a coupling 159, or a combination thereof. In another embodiment, the compression assembly includes, for example, a cross bar 151, a compression puck 155, and a fastener 157. In a further embodiment, the first plate 146 is secured to the rigid container 140 with the compression assembly, and the second plate 144 is secured to the rigid container 140 with one or more of the couplings 159. The first plate 146 encloses the inner portion 143 to form a chamber 147 within the rigid container 140. The second plate 144 covers the integral support plate 145 to protect the integral support plate 145 and form a storage area between the integral support plate 145 and the second plate 144.

In one embodiment, the integral support plate 145, first plate 146, the side wall 142, and/or the inner wall 148 define a shape of the chamber 147. In another embodiment, a deformable and/or cushioning materials, such as one or more foam inserts 153, is positioned within the inner portion 143 to further define the shape of the chamber 147. In a further embodiment, the shape of the chamber 147 is complimentary to the pliable enclosure 131. For example, the shape of the chamber 147 and/or the pliable enclosure 131 includes, but is not limited to, cylindrical, circular, oblong, square, rectangular, hexagonal, octagonal, polygonal, irregular, or a combination thereof.

Figure 10:
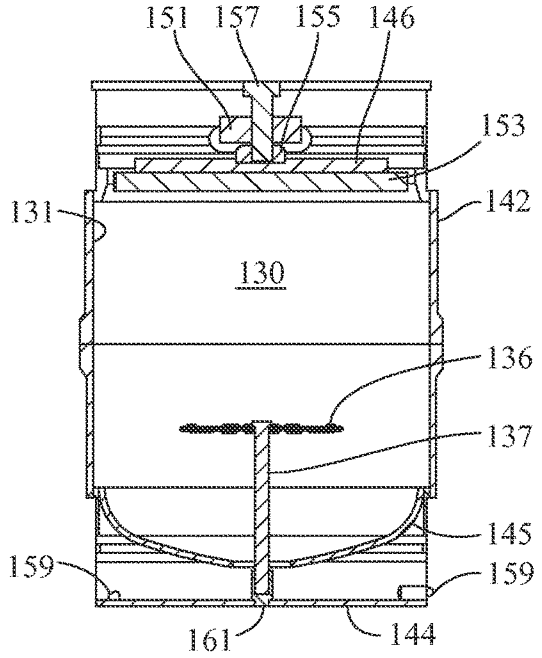
FIG. 10 is a cross-section view of a mixing assembly compressed within a rigid container.
Figure 11:
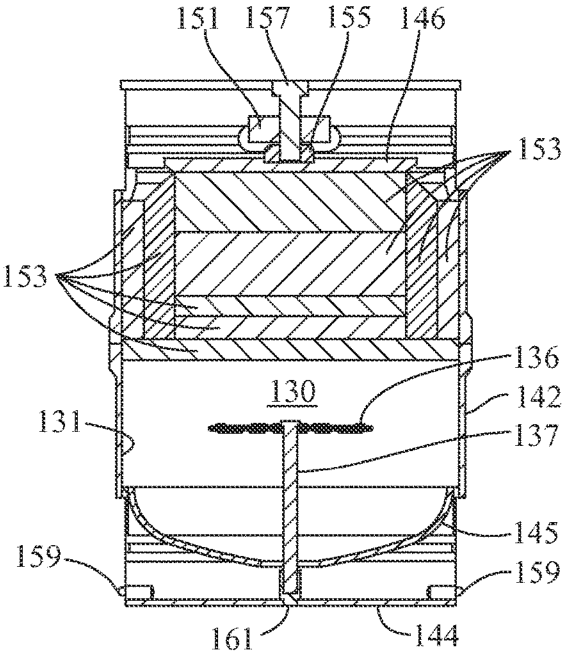
FIG. 11 is a cross-section view of a mixing assembly compressed within a rigid container having a reduced size chamber.
Figure 12:
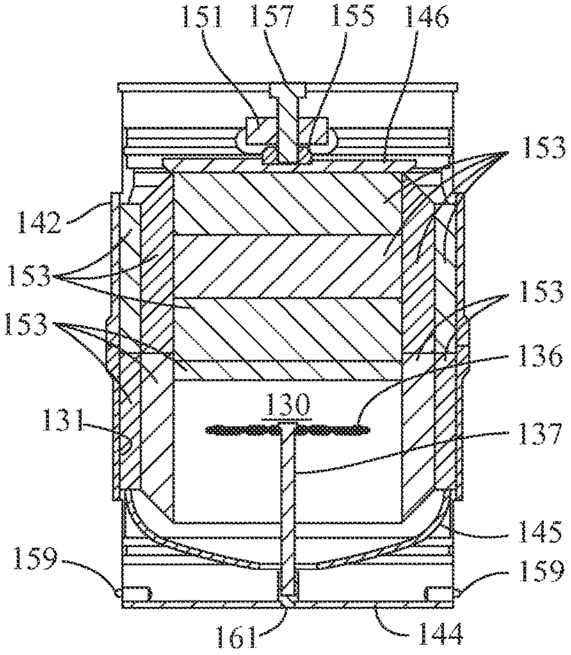
FIG. 12 is a cross-section view of a mixing assembly compressed within a rigid container having a further reduced size chamber.

Prior to securing the first plate 146 to the rigid container 140, the mixing assembly 130 is positioned within the chamber 147. As shown in FIGS. 9-12, positioning the foam inserts 153 varies the size and/or the shape of the chamber 147 to facilitate positioning of any suitable sized pliable enclosure 131 therein. For example, in FIG. 9, the first plate 146, the foam inserts 153, the inner wall 148, the side wall 142, and the integral support plate 145 form the chamber 147 sized to receive a 30 liter pliable enclosure 131. In FIGS. 10, 11, and 12, the foam inserts 153 are positioned to form chambers 147 sized to receive 50 liter, 20 liter, and 10 liter pliable enclosures 131, respectively. After securing the first plate 146 to the rigid container 140, the compression assembly is tightened to compress the mixing assembly 130 within the chamber 147. While the compression assembly is described as including the cross bar 151, the compression puck 155, and the fastener 157, any other force providing mechanism may be used, such as, but not limited to, a clamp, threaded engagement with the rigid container 140, a ratchet, or a combination thereof.

Compressing the mixing assembly 130 within the chamber 147 provides support for shipping and/or transporting the mixing assembly 130 containing the solution, without compromising an integrity of the pliable enclosure 131. In one embodiment, compressing the mixing assembly 130 within the chamber 147 includes positioning the mixing assembly 130 within the rigid container 140, positioning any foam inserts 153 between the mixing assembly 130 and the inner wall 148 and/or the side wall 142, filling the pliable enclosure 131 with the solution, positioning any foam inserts 153 and/or the first plate 146 over the mixing assembly 130, and applying a compression force through the first plate 146 with the force providing mechanism. When compressed, the mixing assembly 130 forms a liner within the chamber 147, the liner 147 being supported by the rigid container 140. The aperture 149 provides access to the mixing assembly 130 within the chamber 147, for example, to remove a sample of the solution. As best shown in FIGS. 8-9, a lid may be detachably secured over the aperture 149 to cover and/or support a portion of the mixing assembly 130 adjacent to the aperture 149 during transporting and/or shipping of the rigid container 140.

The support provided by the rigid container 140 reduces or eliminates stress experienced by the mixing assembly 130 during shipping and/or transporting, for example, from dynamic forces. In one embodiment, compressing the mixing assembly 130 provides the pliable enclosure 131 with a strength equal to, or substantially equal to that of the chamber 147, which corresponds to a strength of a material used for the rigid container 140, the integral support plate 145, the first plate 146, and/or the second plate 144. Suitable materials of the rigid container 140, the integral support plate 145, the first plate 146, and/or the second plate 144 include, but are not limited to, plastic, polypropylene, polyethylene, polyvinyl chloride (PVC), rubber, metal, any other material for compressing the mixing assembly 130, or a combination thereof. For example, in one embodiment, the material of the rigid container 140 includes any material having a decreased pliability as compared to the mixing assembly 130. The decreased stress and/or the increased strength permit the shipping and/or transporting of the mixing assembly 130 without compromising the integrity of the pliable enclosure 131.

In one embodiment, the rigid container 140 includes an article for heating and/or cooling the solution within the pliable enclosure 131, such as, but not limited to, a dimpled jacket. The heating and/or cooling article may be positioned between the pliable enclosure 131 and the rigid container 140, between the foam inserts 153 and the rigid container 140, or between the inner wall 148 and the side wall 142 (i.e., in the open space 150). In another embodiment, the rigid container 140 is partially or completely disposable. In an alternate embodiment, the rigid container 140 is reusable.

Prior to or after shipping and/or transporting the rigid container 140, the mixing shaft 137 is coupled to the drive mechanism 120 to provide movement of the mixing device 136, and mix the solution within the compartment 138 of the pliable enclosure 131. The drive mechanism 120 includes any suitable mechanism for moving the mixing shaft 137 and the mixing device 136. For example, suitable mechanisms include, but are not limited to, a conventional electric motor or a servo motor. In one embodiment, the drive mechanism 120 provides reciprocating axial movement of the mixing device 136. In a further embodiment, the drive mechanism 120 provides variable mixing speed and/or stroke length, such as, but not limited to, continuously variable speed and/or length, stepwise variation in speed and/or length, pre-programmed variations in speed and/or length, or a combination thereof. For example, stepwise variations in the stroke length may include increasing or decreasing the stroke length during mixing of the solution in increments of at least 0.001 inches, between about 0.01 inches and about 10.00 inches, between about 0.01 inches and about 5.00 inches, between about 0.01 inches and about 1.00 inch, between about 0.1 inches and about 0.5 inches, between about 0.2 inches and about 0.3 inches, about 0.25 inches, or any combination, sub-combination, range, or sub-range thereof during mixing of the solution. The variable mixing speed, the mixing device 136, the pliable enclosure 131, and/or the drive mechanism 120 provide the mixing system 100 with decreased shear and decreased air entrainment. Additionally, a rolling impeller drive mechanism 120 reduces or eliminates surface abrasion and particulate generation as compared to other mechanisms providing pumping action to the mixing device 136.

Figure 13:
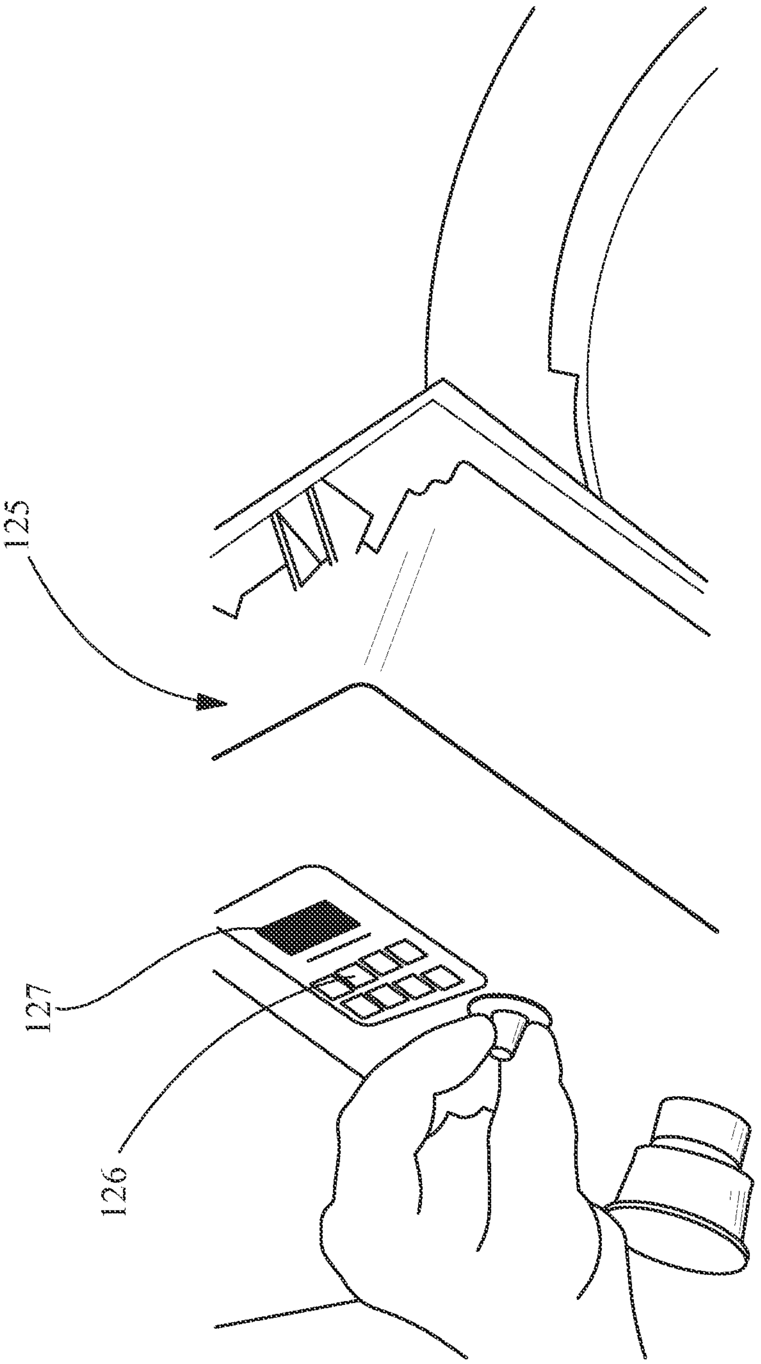
FIG. 13 is a perspective view of a control element.
Figure 14:
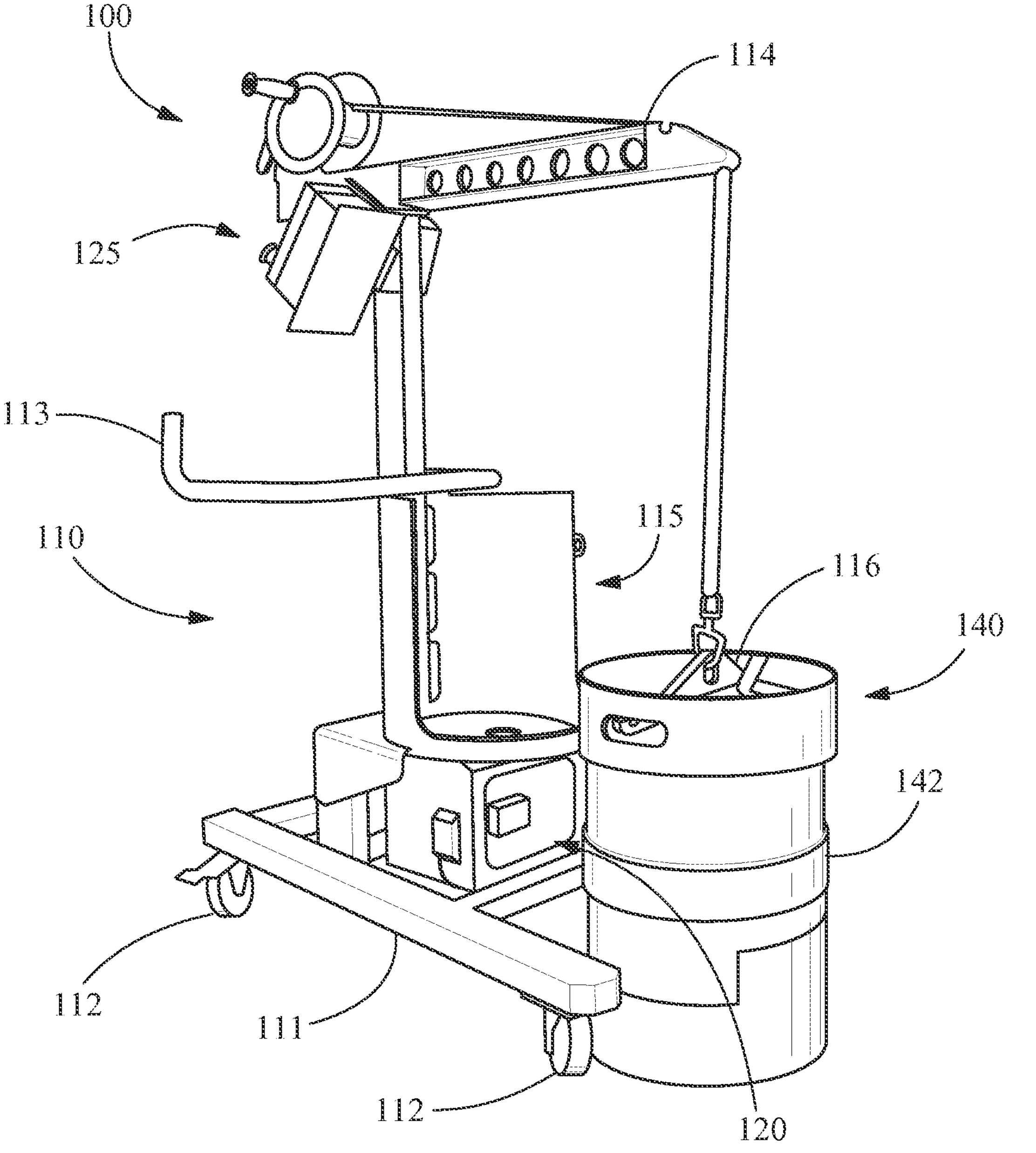
FIG. 14 is a perspective view of a mixing system showing a rigid container detached from a docking station.
Figure 15:
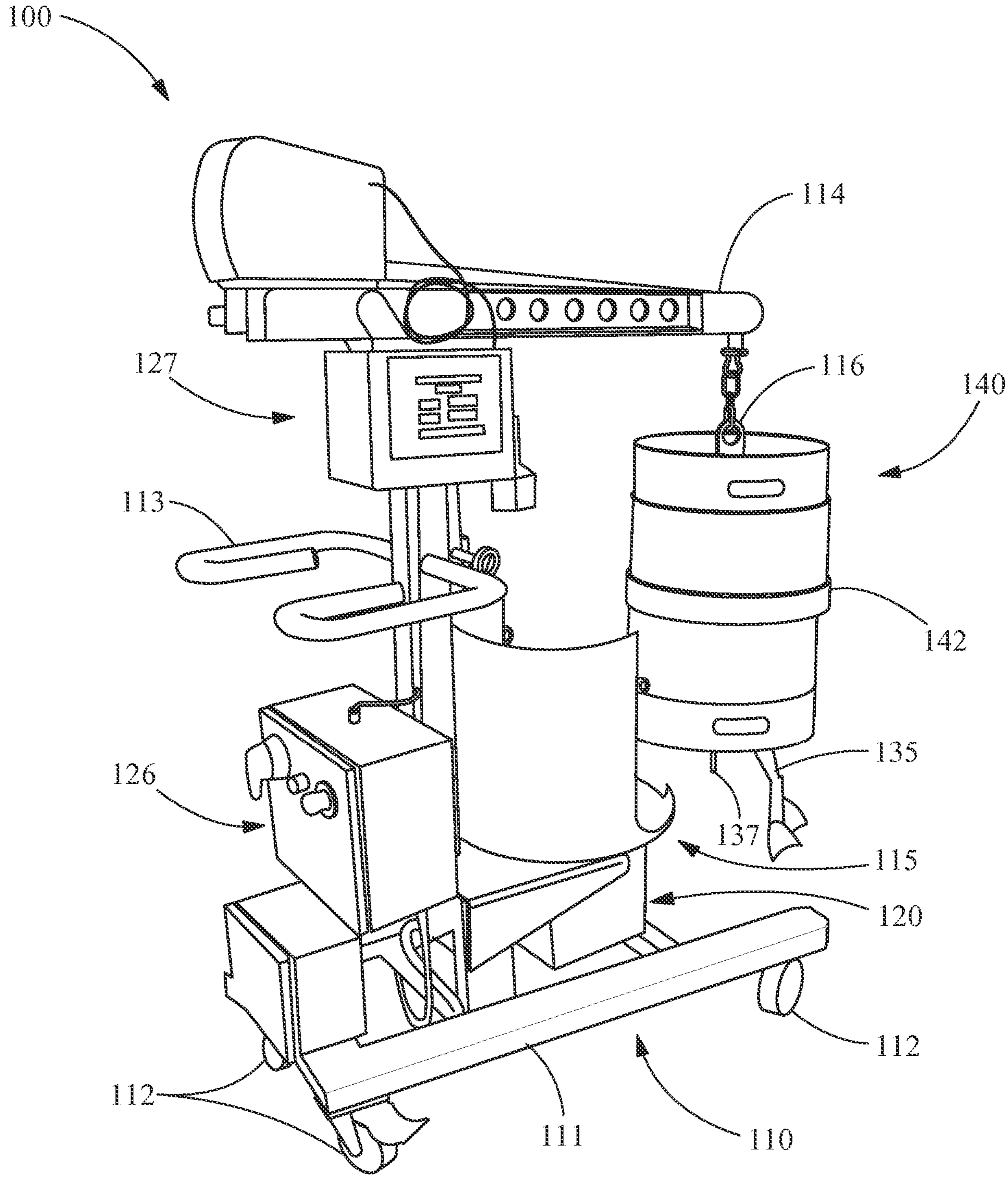
FIG. 15 is a perspective view of a rigid container supported by a hoist mounted to a docking station.
Figure 16:
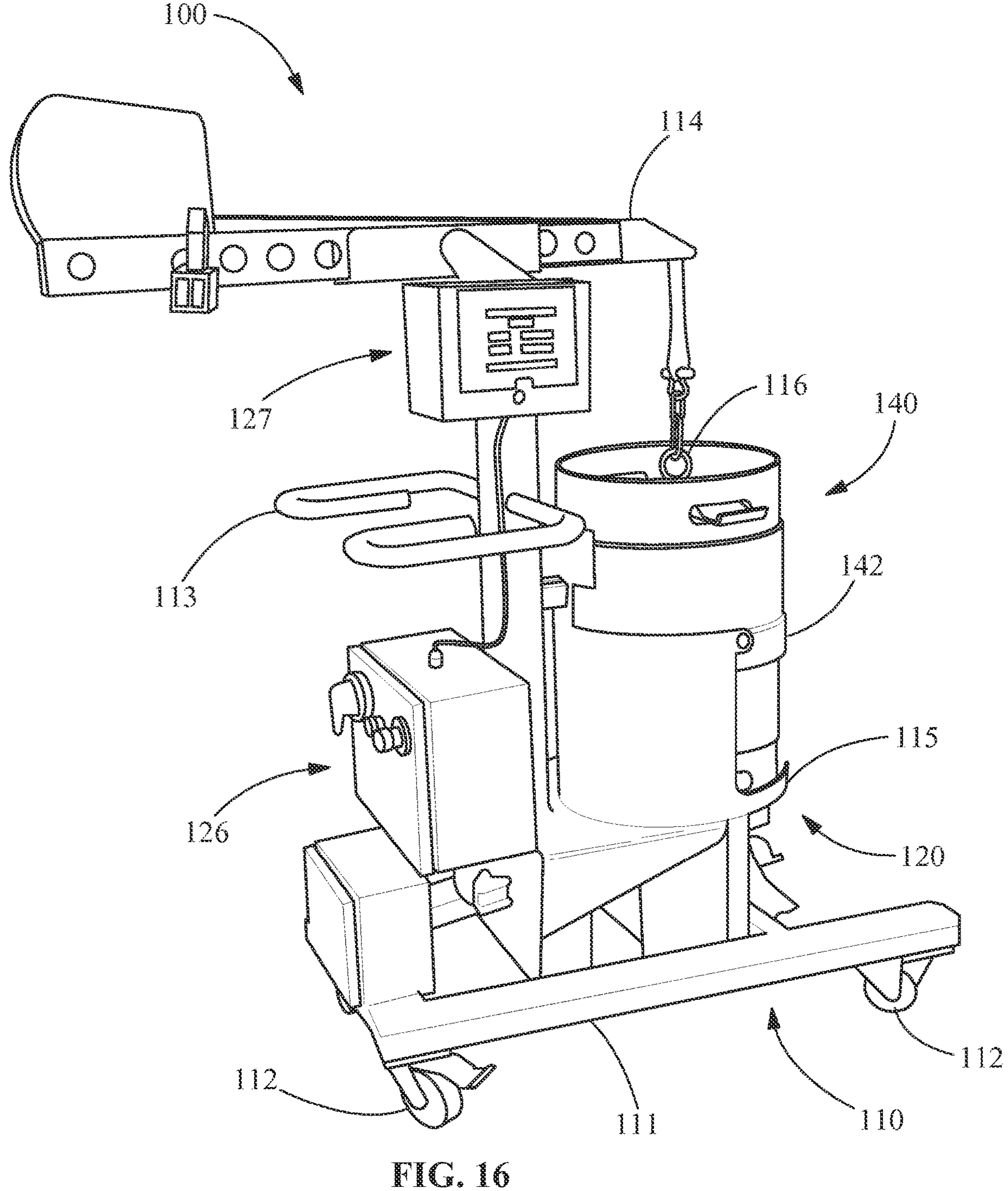
FIG. 16 is a perspective view of a rigid container positioned in a drive cradle of a docking station.

The control element 125, as best seen in FIG. 13, provides control of the mixing system 100 and/or displays mixing information from the mixing system 100. In one embodiment, the control element 125 includes a processor (e.g., a central processing unit), an interface 126, and a display 127. The processor includes any suitable device for receiving, generating, and/or relaying commands, such as, but not limited to, a central processing unit (CPU). The interface 126 includes controls, such as, but not limited to, a button and selector switch interface. In one embodiment, inputs to the interface 126 are provided to the CPU to control operation of the mixing system 100. The display 127 includes any suitable display, such as, but not limited to, a digital display. The display 127 provides visual indication of parameters including, but not limited to, mixing speed, weight, other process monitoring parameters, or a combination thereof. For example, in another embodiment, the display 127 shows the speed of the drive mechanism 120 and the weight of the rigid container 140 including the mixing assembly 130 and the solution within the pliable enclosure 131. The weight of the rigid container 140 is measured by a weight indication system including a measurement device, such as, but not limited to, load cells coupled to the control element 125.

Referring to FIGS. 1 and 14-16, in one embodiment, the drive mechanism 120 and the control element 125 are mounted on the docking station 110. The docking station 110 includes any suitable apparatus for mounting the drive mechanism 120 to and/or supporting the rigid container 140 including the mixing assembly 130. For example, in one embodiment, the docking station 110 includes an adjustable hoist 114 and a drive cradle 115. The adjustable hoist 114 includes a retractable member, such as, but not limited to, a cable or a pulley, for loading and unloading the rigid container 140 into the drive cradle 115. An attachment member 116 for coupling the hoist 114 to the rigid container 140 is secured to one end of the retractable member.

In one embodiment, the drive cradle 115 is arranged adjacent to the drive mechanism 120, such that when the rigid container 140 is positioned in the drive cradle 115 the mixing shaft 137 extends from the mixing assembly 130 through a mixing shaft capture 161 (see FIGS. 9-12) and the drive cradle 115 to couple the mixing device 136 to the drive mechanism 120. Any suitable securing member, such as, but not limited to, a latch, a clasp, a clamp, a lever, or a combination thereof, is provided to secure the rigid container 140 to the drive cradle 115. The securing member may be a single member attached to the rigid container 140 and/or the drive cradle 115 or mating members attached to both the rigid container 140 and the drive cradle 115. Together, the drive cradle 115, the drive mechanism 120, the mixing shaft 137, and the mixing assembly 130 provide interchangeability of the rigid container 140. The interchangeability of the rigid container 140 decreases difficulty and/or the amount of time required for mixing multiple solutions.

Additional components of the docking station 110 include, but are not limited to, load cells coupled with the weight indication system, a power supply and circuit breakers, an electrical and controls enclosure with local disconnect, and/or a data logger for storing and/or transferring data. The data logger is coupled to an external device through wireless or wired data transfer devices, such as, but not limited to, Ethernet cables. In one embodiment, the docking station 110 includes a portable docking station 111 having swivel casters 112, handles 113, the adjustable hoist 114, and the drive cradle 115. The swivel casters 112 facilitate movement of the portable docking station 111, while the handles 113 provide grips for a user to push, pull, and/or otherwise control or move the portable docking station 111. In one embodiment, relay control logic is coupled with manual pushing of the portable docking station 111. In a further embodiment, locking mechanisms are coupled to the swivel casters 112 to stop and/or maintain a position of the portable docking station 111. Suitable locking mechanisms include, for example, hard wired interlocks.

Referring to FIGS. 8-12, and 14-16, in one embodiment, a method of mixing the solution within the compartment 138 of the pliable enclosure 131 includes positioning the mixing assembly 130 within the inner portion 143 defined by the side wall 142 of the rigid container 140, providing the solution to the mixing assembly 130, and then securing the first plate 146 and the force providing mechanism to the rigid container 140, the first plate 146 being opposite the integral support plate 145 with respect to the mixing assembly 130. After securing the first plate 146 to the rigid container 140, the method includes compressing the mixing assembly 130 with the first plate 146, transporting the rigid container 140, removing the second plate 144 to expose the mixing shaft 137, positioning the rigid container 140 in the drive cradle 115, coupling the drive mechanism 120 to the mixing device 136 within the mixing assembly 130, and activating the drive mechanism 120 to move the mixing device 136 and mix the solution within the mixing assembly 130. In a further embodiment, prior to compressing the mixing assembly 130 and transporting the rigid container 140, the solution within the compartment 138 is mixed with the drive mechanism 120. After positioning the mixing assembly 130 within the inner portion 143, the aperture 149 provides access to the at least one outlet 135 for removing a sample of the solution within the mixing assembly 130.

While the invention has been described with reference to one or more embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A mixing system, comprising:

a container comprising:

an encircling sidewall bounding a chamber and extending between an upper end and an opposing lower end;

a support plate disposed within the chamber and secured to the encircling sidewall;

an inner wall secured to the support plate and projecting within the chamber toward the upper end, an open space being formed between the inner wall and the encircling sidewall; and a first aperture extending through the encircling sidewall so as to communicate with the open space;

a lid removably mounted to the sidewall of the container and covering the first aperture; and a mixing assembly positioned within the container and supported on the support plate, the mixing assembly including a pliable enclosure and a mixing device.

2. The mixing system of claim 1, further comprising a second aperture extending through the inner wall so as to provide communication between the open space and a portion of the chamber housing the mixing assembly.

3. The mixing system of claim 2, wherein the second aperture and the first aperture are horizontally aligned when the container is vertically upstanding.

4. The mixing system of claim 2, further comprising an outlet formed on the pliable enclosure, the second aperture providing access to the outlet.

5. The mixing system of claim 1, further comprising the support plate having an opening extending therethrough.

6. The mixing system of claim 5, further comprising a portion of the mixing device extending from the pliable enclosure and passing through the opening on the support plate.

7. The mixing system of claim 1, wherein the inner wall comprises a flat linear wall.

8. The mixing system of claim 1, wherein at least a portion of the inner wall is cylindrical and is concentrically disposed within the sidewall of the container.

9. The mixing system of claim 1, further comprising a first plate detachably secured to an upper end of the sidewall so that the pliable enclosure is disposed between the first plate and the support plate.

10. The mixing system of claim 1, further comprising:

the support plate dividing the chamber into an upper compartment and a lower compartment, the pliable enclosure of the mixing assembly being positioned within upper compartment of the container; and a second plate detachably secured to the container so that at least a portion of the lower compartment is disposed between the support plate and the second plate.

11. The mixing system of claim 10, wherein a portion of the mixing device passes through an opening extending through the support plate and is disposed between the support plate and the second plate.

12. A mixing arrangement comprising:

the mixing system as recited in claim 1; and a docking station comprising a cradle and a drive mechanism, the mixing system being disposed in the cradle with a portion of the mixing device extending through an opening on the support plate and being coupled with the drive mechanism.

13. The mixing arrangement as recited in claim 12, wherein the docking station further comprises a hoist arranged and disposed to load and unload the container into the drive cradle.

* * * * *